United States Patent [19]

Houle

[11] 4,392,806

[45] Jul. 12, 1983

[54] EJECTING ICE-CREAM SCOOP

[76] Inventor: Laurent Houle, 371 - 2nd St., East, La Sarre, Quebec, Canada, J9Z 2H8

[21] Appl. No.: 311,358

[22] Filed: Oct. 15, 1981

[30] Foreign Application Priority Data

Oct. 20, 1980 [CA] Canada .................................. 362684

[51] Int. Cl.³ ........................... B29C 1/00; A23P 1/00
[52] U.S. Cl. ..................................... 425/286; 30/128; 73/426; 249/66 R; 294/55
[58] Field of Search ............... 425/286, 187, 182, 285; 249/66 R, 74; 30/128, 130; 426/389; 73/426; 294/55

[56] References Cited

U.S. PATENT DOCUMENTS

| 2,239,046 | 4/1941 | Lloyd | 425/286 |
| 2,669,194 | 2/1954 | Brown | 425/286 |
| 2,756,698 | 7/1956 | Eichin et al. | 425/286 |
| 4,161,381 | 7/1979 | Sciortino | 425/286 |

Primary Examiner—Willard E. Hoag

[57] ABSTRACT

There is disclosed an ice-cream scoop including a semi-spherical bowl, a handle extending from and rigid with the bowl and an ejector pivotally mounted on the handle adjacent the bowl to separate the ball of ice-cream from the bowl. The bowl has a bottom opening and a slot communicating with the bottom opening and extending to the rim of the bowl. The handle is formed with a cavity adjacent the bowl, said cavity opening at the top and bottom of the handle and communicating with the slot. The ejector comprises an arcuate tongue conforming to the interior and exterior surfaces of the bowl and to the shape of the bottom opening and of the slot, so that when the tongue is bottomed in the bowl, it fills the bottom opening and the slot, and is substantially flush with both interior and exterior surfaces of the bowl. The ejector further includes a lever arm rigid with the tongue extending in the cavity of the handle and accessible from both the top and bottom of the handle. Upon upward manual pressure exerted on the lever arm, the ejector will be pivoted to a position in which the tongue is bottomed in the bowl, and upon downward manual pressure exerted on the ejector, the tongue will be lifted away from the bowl bottom.

5 Claims, 5 Drawing Figures

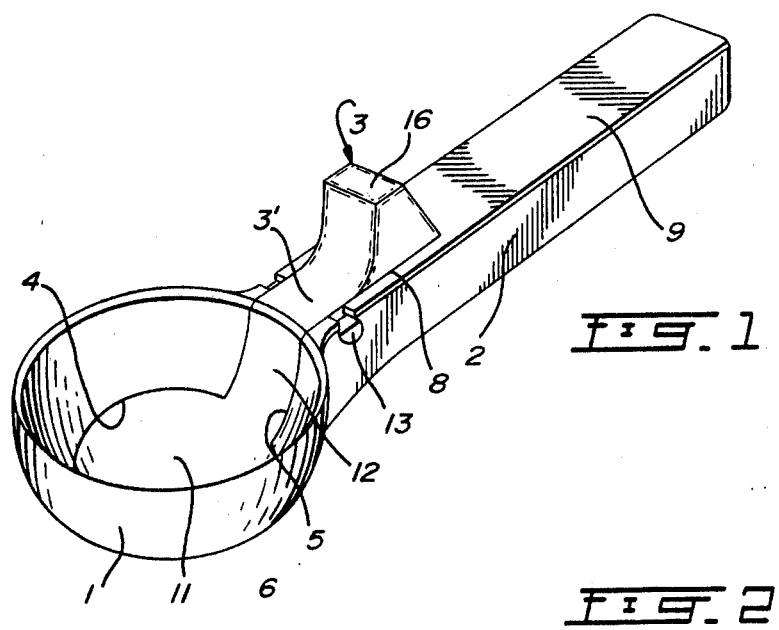
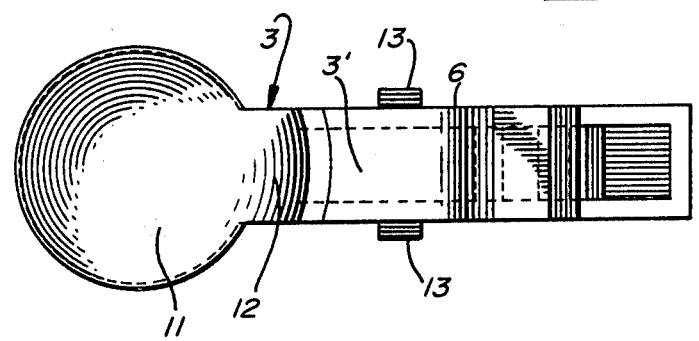
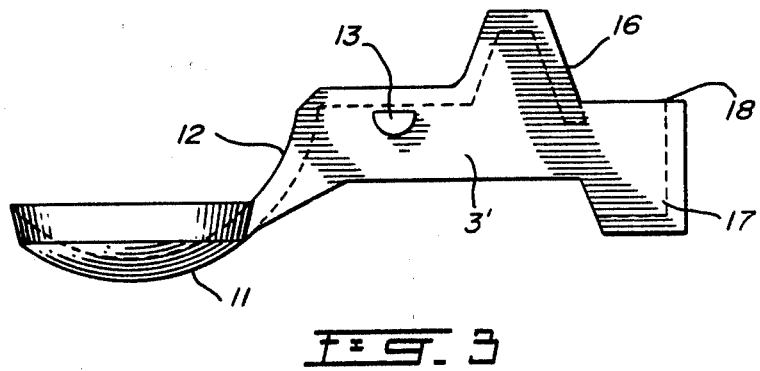

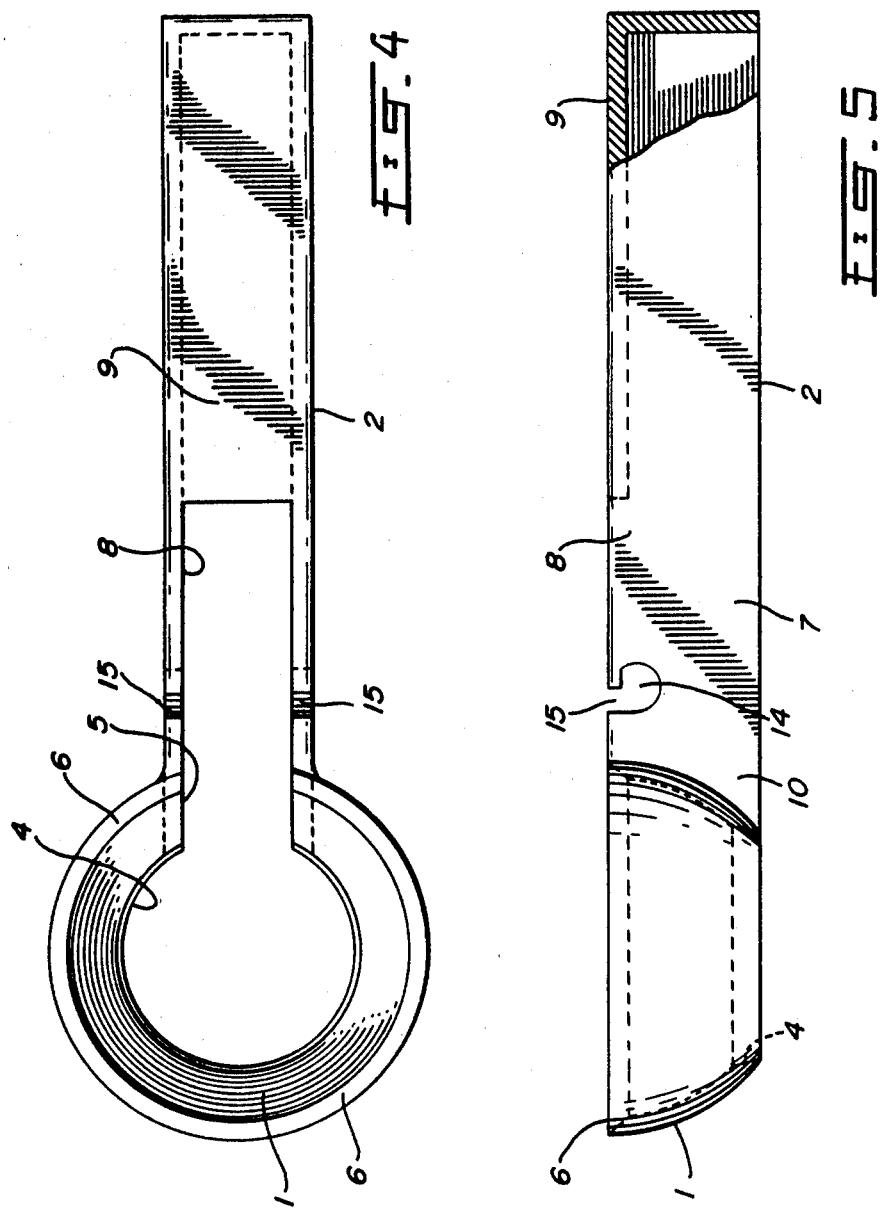

EJECTING ICE-CREAM SCOOP

FIELD OF INVENTION

This invention relates to a manually-operated ice-cream scoop which separates and ejects, the ball of ice-cream or some other such material, from the scoop so that it may be deposited onto an ice-cream cone or onto any other container.

BACKGROUND OF INVENTION

It is common in ice-cream scoops which separate the ball of ice-cream from the scoop that they have a hoop which separates the ice-cream from the scoop and that this hoop be mounted on a shaft which is rotated by a gear or lever and that the shaft or gear or lever which operates the shaft be attached to a spring so that release of hand pressure causes the hoop to return to its original position. Ice-cream scoops of this kind are cumbersome, complex in design and have a number of moving parts which break down, such as the hoop, and the spring and gears which operate the hoop and they are difficult to keep clean.

U.S. Pat. No. 4,161,381 dated July 17, 1979 to August M. Sciortino describes an ice-cream scoop obviating the above-noted disadvantages in that the hoop, gears and springs are eliminated and replaced by an injector pivoted on the handle adjacent the semi-spherical bowl and including an arcuate tongue conforming to the bowl when in bottomed position in the bowl. To accommodate the tongue, the bowl bottom and side wall are recessed. This recess causes protrusion on the outside surface of the bowl and this is detrimental to the scooping action within the ice-cream. Moreover, the scoop of this Patent is difficult to clean, because the ejector is not detachable from the scoop itself and the underside of the tongue is difficult of access.

SUMMARY OF INVENTION

The ice-cream scoop of the invention comprises a semi-spherical bowl, a handle having one end portion fastened to the bowl, the bowl having a top rim, a bottom opening and a slot communicating with the bottom opening and extending to the rim, the handle having a portion adjacent the bowl formed with a cavity opening at the top of the handle and communicating with the slot, the slot being in alignment with the handle, and an ejector pivotally mounted on the handle about a pivotal axis transverse to the handle and adjacent the bowl. The injector includes an arcuate tongue conforming to the interior and exterior surfaces of the bowl and to the shape of said bottom opening and of said slot, so that, when the tongue is bottomed in the bowl, it fills the bottom opening and the slot and is substantially flush with both the interior and exterior surfaces of the bowl. The ejector further includes a lever arm rigid with the tongue and extending into the handle cavity away from the pivotal axis of the ejector relative to the tongue. The lever arm is accessible through the top of the handle, whereby downward pressure exerted on the lever arm, will cause lifting of the tongue away from the bowl bottom. Preferably also, the lever arm is accessible through the bottom of the handle, whereby upward pressure exerted on said lever arm from the bottom of the handle, will pivot the tongue to bottomed position in the bowl.

Preferably also, the ejector has a detachable pivotal connection with the handle, so that it can be easily removed for cleaning of the parts.

BRIEF DESCRIPTION OF THE DRAWINGS

The annexed drawings illustrate a preferred embodiment of the invention, wherein:

FIG. 1 is an isometric view of the complete embodiment;

FIG. 2 is a top plan view of the pivoting and ejecting mechanism;

FIG. 3 is a side view of the pivoting and ejecting mechanism;

FIG. 4 is a top plan view of the scoop body and its handle; and

FIG. 5 is a side view of the scoop body and its handle partly in section.

DETAILED DESCRIPTION OF INVENTION

The ice-cream scoop in accordance with a preferred embodiment comprises a generally semi-spherical bowl 1 fastened to one end of an elongated handle 2 and an ejector, generally indicated at 3. The bottom of bowl 1 is formed with a preferably circular opening 4, which communicates with a slot 5 extending through the side wall of the bowl 1 and up to the rim 6 of bowl 1. The handle 2 is preferably of U-shape cross-section and, at any rate, defines a cavity 7 adjacent the bowl 1, said cavity defining an opening 8 at the top 9 of the handle and an opening 10 at the bottom of the handle. The cavity 7 is in communication with the slot 5. The ejector 3 includes a transversely arcuate tongue formed of integral portions 11 and 12. Terminal portion 11 is rounded in shape and is transversely arcuate to conform to the rounded shape of opening 4 and to the curved interior and exterior surfaces of the bowl 1. Portion 11 is also arcuate in transverse section to conform with the arcuate exterior and internal surfaces of the side wall of bowl 1. Portion 11 has the shape of the slot 5. Therefore, when the tongue 11, 12 of the ejector is bottomed in bowl 1, the external and internal surfaces of the tongue are substantially flush with the internal and external surfaces of the bowl 1, respectively, and the portions 11 and 12 of the tongue completely fill the opening 4 and the slot 5, respectively, of the bowl 1. The tongue 11, 12 is integral with a lever arm, generally indicated at 3′, and adapted to extend within the cavity 10 of the handle. This lever arm has laterally-protruding pivot pins, or studs 13. These pivot pins are shaped as a shaft having one side flattened. These pivot pins 13 are adapted to removably engage two notches 14 formed in the handle 2 adjacent bowl 1. These notches 14 are made as a hole of a diameter large enough for pivot studs 13 to freely rotate in the same. These holes 14 have a slot 15 through the top of the handle. The slot is narrower than the widest part of the pivotal studs 13 and wider than the narrowest part of the same so that, when the ejector 3, when turned to a position at substantially right angle to the handle 2, will permit the pivotal studs 13 to pass through the narrow slots 15, thus allowing the ejector 3 to be separated from the scoop 1,2 to facilitate cleaning. In the bottomed position of the tongue 11, 12, the lever 3′ fills the top opening 8 of the handle and has a portion disposed on the side of the pivot studs 13 opposite the tongue 11, 12. This portion of the lever arm is provided with a boss 16 extending through the top opening 8 of the handle and protruding from the top 9. The lever arm has also a bottom boss 17 slightly protruding from the bottom of the handle and accessible through said bottom. Finally, the ejector has a top surface 18 adapted to abut against the bottom side of the top wall 9 of the handle 2 when the tongue 11, 12 is in bottomed position in the bowl. Supposing the ejector 3 is bottomed in the bowl, the handle can be fully grasped with one hand and a ball of ice-cream is scooped by the bowl 1 and tongue 11, 12 from an ice-cream container. This scooping operation is facilitated, since there are no protrusions on the inside and outside surfaces of the bowl 1 and tongue portion 11. Whenever it is desired to separate the ball of ice-cream from the bowl 1, simple downward pressure is exerted on the top boss 16. Once the ball of ice-cream has been discharged, the ejector is returned to its initial bottomed position by a simple upward pressure exerted by a finger on the downwardly-extending boss 17. Whenever it is desired to clean the parts, the ejector is fully pivoted with the tongue extending upwardly at right angle to the handle and then the pivot studs 13 can be removed from within the pivot holes 14. Tongue portion 11 and opening 4 are complementarily bevelled to fit in bottomed position.

What I claim is:

1. An ice-cream scoop comprising a generally semi-spherical bowl, a handle having one end portion fastened to said bowl, said bowl having a top rim, a bottom opening and a slot communicating with said bottom opening and extending to said rim, said handle having a portion adjacent said bowl formed with a cavity opening at the top and at the bottom of said handle and communicating with said slot, said slot being in alignment with said handle, an ejector pivotally mounted on the handle about a pivotal axis transverse to said handle and adjacent the bowl and comprising an arcuate tongue conforming to the interior and exterior surfaces of the bowl and to the shape of said bottom opening and of said slot, so that, when said tongue is bottomed in the bowl, it fills said bottom opening and said slot and is substantially flush with both the interior and exterior surfaces of the bowl, said ejector further including a lever arm rigid with said tongue and extending into said cavity, said lever arm having a portion extending on the opposite side of said tongue relative to the pivotal axis of said ejector, said portion exposed and accessible through the top and through the bottom of said handle, whereby downward manual pressure exerted on said portion from the top of said handle, will cause lifting of said tongue away from the bowl bottom, and upward manual pressure exerted on said portion from the bottom of said handle, will pivot said tongue to bottomed position in said bowl.

2. An ice-cream scoop as defined in claim 1, wherein said lever arm portion has an upwardly-extending boss and a second downwardly-extending boss protruding upwardly and downwardly, respectively, from the top and bottom of said handle in the bottomed position of said tongue.

3. An ice-cream scoop as claimed in claim 1 or 2, wherein said lever arm portion forms an abutment abutting against the underside of the top of said handle in the bottomed position of said tongue.

4. An ice-cream scoop as claimed in claim 1 or 2, wherein the ejector is detachable from the handle when the ejector is pivoted to a position at substantially right angle to the handle.

5. An ice-cream scoop as claimed in claim 1 or 2, wherein the lever arm of said ejector is provided with laterally-extending pivotal studs, of elongated cross-section, and the sides of said handle are provided with holes to pivotally receive said studs, said holes each having a notch opening at the top of the handle, said notch being narrower than the widest part of the pivot studs and wider than the narrowest part of the pivot studs, said notches preventing removal of said studs from said holes in any position of said ejector other than the position at substantially right angle to said handle.

* * * * *